United States Patent
Garcia

(10) Patent No.: US 9,226,493 B2
(45) Date of Patent: Jan. 5, 2016

(54) VARMINT AND INTRUDER DETERRENT SYSTEM

(71) Applicant: Mesa Digital, LLC, Albuquerque, NM (US)

(72) Inventor: Ricardo Garcia, Albuquerque, NM (US)

(*) Notice: Subject to any disclaimer, the term of this patent is extended or adjusted under 35 U.S.C. 154(b) by 191 days.

(21) Appl. No.: 14/054,232

(22) Filed: Oct. 15, 2013

(65) Prior Publication Data

US 2014/0124044 A1 May 8, 2014

Related U.S. Application Data

(60) Provisional application No. 61/721,551, filed on Nov. 2, 2012.

(51) Int. Cl.
| | | |
|---|---|---|
| A01M 29/30 | (2011.01) | |
| A01G 25/16 | (2006.01) | |
| A01M 31/00 | (2006.01) | |

(52) U.S. Cl.
CPC ............. *A01M 29/30* (2013.01); *A01M 31/002* (2013.01); *A01G 25/16* (2013.01); *Y10T 137/1842* (2015.04)

(58) Field of Classification Search
CPC ... A01M 29/30; A01M 31/002; A01M 29/00; A01K 15/02; G05B 2219/2625; A01G 25/16; A01G 25/162; A01G 25/165; A01G 25/167; Y10T 137/189; Y10T 137/1866; Y10T 137/1842
USPC .................. 137/78.1, 78.2, 78.3; 251/129.06, 251/129.01, 129.04, 129.05; 119/712; 239/67–70; 43/1; 340/573.2, 573.1; 700/284

See application file for complete search history.

(56) References Cited

U.S. PATENT DOCUMENTS

| | | | | |
|---|---|---|---|---|
| 4,552,307 A | | 11/1985 | Stedham | |
| 4,852,802 A | * | 8/1989 | Iggulden et al. | 239/64 |
| 5,009,192 A | * | 4/1991 | Burman | 119/720 |
| 5,458,093 A | * | 10/1995 | MacMillan | 119/720 |
| 5,561,576 A | * | 10/1996 | Baldwin | 361/41 |
| 5,589,747 A | * | 12/1996 | Utke | 318/468 |
| 5,603,287 A | * | 2/1997 | Houck | 119/719 |
| 5,892,446 A | * | 4/1999 | Reich | 340/573.1 |

(Continued)

OTHER PUBLICATIONS

Very simple IR detector that controls relay (by: ScienceProg, Pub: May 23, 2007).*

(Continued)

*Primary Examiner* — Craig Schneider
*Assistant Examiner* — David Colon Morales
(74) *Attorney, Agent, or Firm* — Kermit D. Lopez; Luis M. Ortiz; Ortiz & Lopez, PLLC

(57) ABSTRACT

A system for deterring animals and humans from entering protected sprinkler zones. Motion sensors are placed in an area to be protected. Upon detection of a trespasser (e.g., animals or humans) within the protected area, the sensors produce a signal for activating sprinklers in the zone and/or other appropriate zones. The sensor output can be electrically connected to a step down transformer, which is connected to an appropriate sprinkler valve or to the sprinkler valve output at, for example, the sprinkler control box. The sprinkler valve can be activated and an appropriate sprinkler zone turned on to spray the trespasser with water. New or existing sprinkler systems can be utilized for varmint and/or intruder deterrent without utilizing complex electronics.

10 Claims, 4 Drawing Sheets

(56) References Cited

U.S. PATENT DOCUMENTS

| | | | |
|---|---|---|---|
| 6,191,693 B1 | 2/2001 | Sangsingkeow | |
| 6,373,385 B1* | 4/2002 | Wheeler | 340/541 |
| 6,407,670 B1* | 6/2002 | Dysarsz et al. | 340/573.2 |
| 6,700,486 B1* | 3/2004 | Banki | 340/541 |
| 7,191,735 B2 | 3/2007 | Wolfgram | |
| 7,286,904 B2* | 10/2007 | Graham | 700/284 |
| 7,287,489 B1 | 10/2007 | O'Brien | |
| 7,462,364 B2* | 12/2008 | Bell | 424/405 |
| 7,658,166 B1* | 2/2010 | Rheinschmidt et al. | 119/718 |
| 7,690,146 B2* | 4/2010 | Jong et al. | 43/1 |
| 7,834,769 B2 | 11/2010 | Hinkle et al. | |
| 7,913,653 B2* | 3/2011 | Jordan | 119/859 |
| 8,904,968 B1* | 12/2014 | Nelson | 119/712 |
| 2003/0094507 A1* | 5/2003 | Anzivino | 239/70 |
| 2004/0170404 A1 | 9/2004 | Kenney | |
| 2005/0120977 A1 | 6/2005 | Boyd | |
| 2006/0213449 A1* | 9/2006 | Dodge | 119/329 |
| 2008/0136630 A1 | 6/2008 | Leggett et al. | |
| 2008/0251602 A1* | 10/2008 | Leggett et al. | 239/69 |
| 2009/0179759 A1* | 7/2009 | Koury et al. | 340/557 |

OTHER PUBLICATIONS

Infrared Motion Detector Circuit (by: Circuits Today, Pub: Jan. 24, 2012).*
IR Motion Detector Alarm (by: Ecco, Pub: Sep. 9, 2012).*
Motion Sensor Switch for alarm, light or water sprinkler (by: Anonymous, Pub: Aug. 8, 2012).*

* cited by examiner

VARMINT AND INTRUDER DETERRENT SYSTEM

CROSS-REFERENCE TO PROVISIONAL APPLICATION

This patent application claims the benefit under 35 U.S.C. §119(e) of U.S. Provisional Application Ser. No. 61/721,551 which was filed on Nov. 2, 2012 and is incorporated herein by reference in its entirety.

FIELD OF THE INVENTION

Embodiments are generally related to the deterrence of intruders from entering certain areas. Embodiments also relate to IR sensors, transformers, and light activated relays. Embodiments also relate to sprinkler systems and related devices and components.

BACKGROUND

Electronically controlled irrigation systems typically include sprinklers, electric zone valves, and one or more electric controllers. Individual sprinklers are fed by underground water pipes connected to a water supply source and communicate with electrically operated solenoid zone valves. Such zone valves are typically Alternating Current (AC) powered solenoid valves, which are "hard wired" directly to the controller. Control wires also connect the controller to the solenoid valves, which are usually buried underground.

Typical controllers are AC powered and are mounted on a wall near an AC outlet, located either indoors or outdoors. The controllers are typically of solid state design and allow a user to control the sequence of zones to be watered, the starting time of each watering, the duration of each watering, and intervals between watering events.

Residential and commercial properties having irrigation systems installed are known for taking pride in the beauty of their lawn and flora, and perhaps the productivity of vegetables gardens. Such irrigation systems, however, do not offer any animal or human security or deterrent benefits to the property. Animal and human security deterrent systems are typically stand-alone systems that are incapable of being integrated with current irrigation systems. This creates added cost and complexity to the installation of stand-alone trespasser deterrent systems.

In one retrofit automatic irrigation system for animal and human deterrent control, one or more motion sensors may be placed within a bordered zone monitored for trespassers. Such motion sensors can detect a body entering a bordered zone and generate a trespasser signal having a unique ID. A programmable control receiver module receives the signal and activates a solenoid control valve to spray the trespasser with water. This wet and/or scares off the trespasser and prevent the entering of trespasser into the protected zone.

Such systems require complex and expensive designs, including the use of devices such as, for example, a programmable control receiver module. The conventional intruder detection and deterrent system affects the operation of an existing sprinkler system and requires modification of the sprinkler control system or the sprinkler valve.

Based on the foregoing, it is believed, there is a requirement for a human and animal deterrent control apparatus that can be easily and inexpensively retrofitted directly onto existing or with new irrigation systems.

SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an apparatus and a method of deterring animals and humans from entering certain areas.

It is another aspect of the disclosed embodiments to provide for an apparatus for retrofitting irrigation systems for animal and human deterrent control.

It is a further aspect of the present invention to provide for an apparatus and a method for directly activating appropriate sprinklers within an irrigation system to spray a trespasser with water, in response to a detection of motion of the intruder in a protected area.

The aforementioned aspects and other objectives and advantages can now be achieved as described herein. An apparatus and method of deterring animals and humans from entering in a zone to be protected is disclosed. Motion sensors are placed in an area to be protected. Upon detection of trespassers (e.g., animals or humans) within a protected area, the sensors produce a signal for activating sprinklers in appropriate zones. The sensor output (signal) can be connected to, for example, a step down transformer which can be directly connected to the appropriate sprinkler valve. The output of the transformer activates appropriate sprinkler valve to spray the trespasser with water.

The control voltage to the sprinkler valve comes from two sources, the sprinkler control unit and intrusion detection unit. Both sources are isolated from each other by a light activated relay in the intrusion detection unit. Therefore, the output from the sprinkler control unit and the control line to sprinkler valve must be connected to the intrusion detection unit. Control voltage to the sprinkler valve is routed through and controlled by the light activated isolation relay in the intrusion detection unit. The detection portion includes a passive infrared (IR) sensor typically used in residential applications to control external security lights. The sensor output can be directly connected the sprinkler valve or to the sprinkler valve output at the sprinkler control box. The present invention allows easy and inexpensive way of retrofitting of a human and animal deterrent control apparatus onto an existing automatic irrigation system without utilizing complex electronics.

The intruder detection and deterrent system does not affect the operation of an existing sprinkler system. It is a security addition that is simply connected between the sprinkler controller output and the sprinkler valve input. No modification of the sprinkler control system or sprinkler valve is required. The system is designed to control only one sprinkler valve in a protected sprinkler zone. If another zone is to be protected, another intruder module have to be added. The system is fairly easy to install and utilizes typical, inexpensive residential security light sensors.

BRIEF DESCRIPTION OF THE FIGURES

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, the disclosed embodiments describe one or more systems for deterring animals and humans from entering protected sprinkler zones. Motion sensors can be placed in an area to be protected. Upon detection of a trespasser (e.g., animals or humans) within the protected area, the sensors produce a signal for activating sprinklers in the zone and/or other appropriate zones. The sensor output can be electrically connected to a step down transformer, which is connected to an appropriate sprinkler valve or to the sprinkler valve output at, for example, the sprinkler control box. The sprinkler valve can be activated and an appropriate sprinkler zone turned on to spray the trespasser with water. New or existing sprinkler systems can be utilized for varmint and/or intruder deterrent without utilizing complex electronics.

Figure 1:
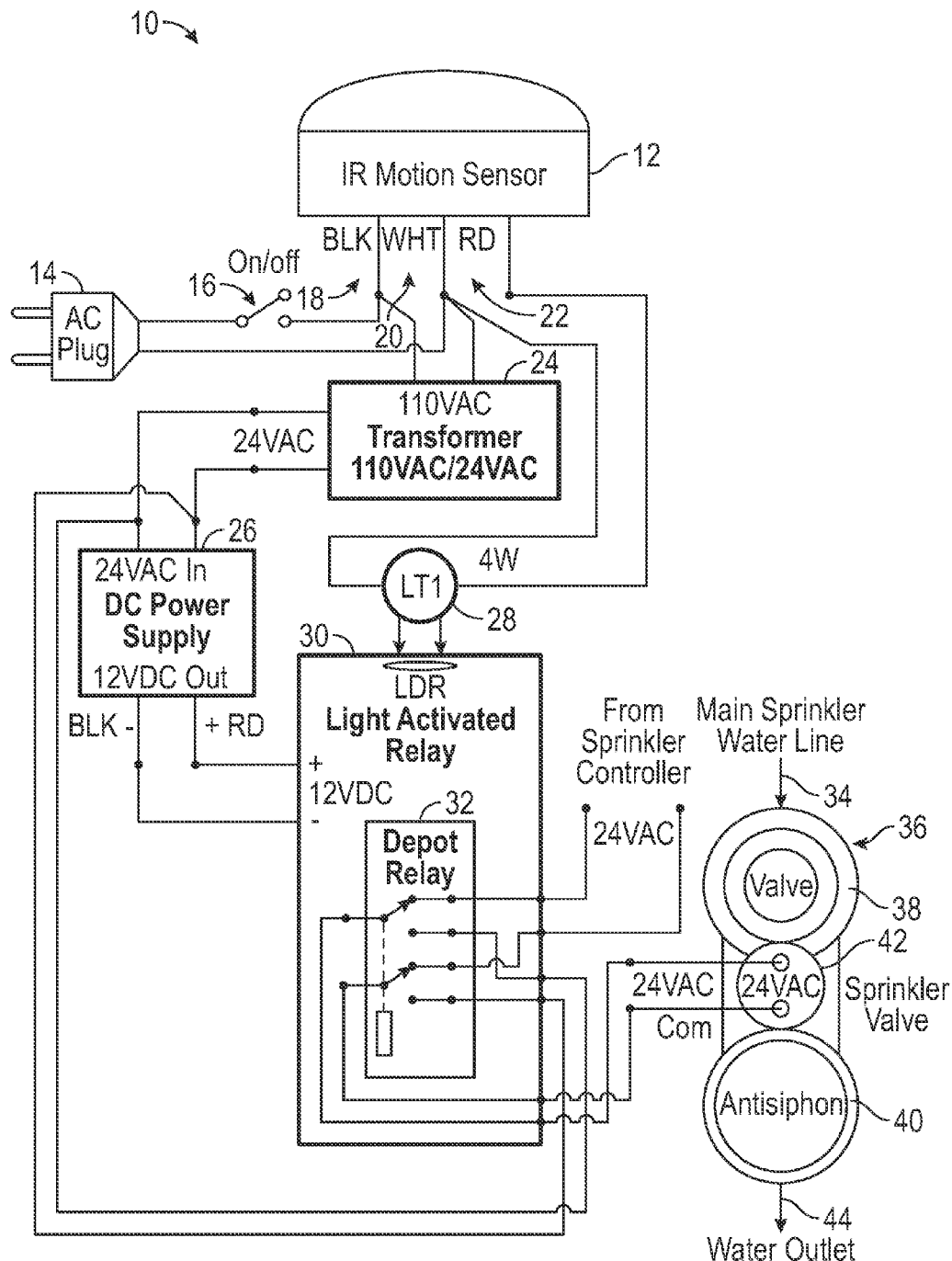
FIG. 1 illustrates a schematic diagram of a varmint and intruder deterrent system using an IR sensor and an existing sprinkler system, in accordance with the disclosed embodiments.

FIG. 1 illustrates a schematic diagram of a varmint and intruder deterrent system 10 that includes an IR motion sensor 12 that connects electrically with a transformer 24 via one or more electrical lines 18, 20, 22 (respectively, BLK, WHT and RD). Lines 18 and 20 feed to an AC outlet 14 via a switch 16 (i.e., ON/OFF). The transformer 24 is further connected electrically to a DC power supply 26, which in turn is electrically connected to a light activated relay 30 which includes a double pole, double throw (DPDT) relay 32, which further is connected to a sprinkler controller (24V AC) and a sprinkler valve 36. The sprinkler valve 38 includes a valve unit 38 that is connected to a main sprinkler water line 34 and an antisiphon unit 40, which in turn feeds to a water outlet 44. The sprinkler valve 36 functions with respect to 24V AC. The light activated relay 30 prevents feedback between the infrared (IR) sensor 12, transformer 24, and controller such as, for example, a sprinkler control unit.

The system 10 shown in FIG. 1 can be powered by 20 VAC and include a 120 VAC to 24 VAC step down transformer. The 24 VAC powers the 12 VDC power supply 26 and also serves as the 24 VAC output to the sprinkler valve 36. The 12 VDC power supply powers the light activated isolation relay 30 and the DPDT relay 32. The light activated relay 30 serves to prevent feedback between the IR Sensor 12, the transformer 24, and the sprinkler control unit.

The detection portion of system 10 is taken care of by the passive infrared (IR) detector 12, which may be, for example, a typically used sensor in residential applications to control external security lights. The unit can be set to operate in the TEST mode. This unit can include, for example, a pyroelectric heat sensing element, an optical lens system, a low-current power supply, and a logic circuit analyzer. A passive infrared sensor, unlike ultrasonic, microwave, or photoelectric beams does not transmit any energy into the area it protects. The output of the IR detector 10 can be fed directly to a 120 VAC, 4 W, incandescent lamp (LTI) 28. This light in turn can activate the light activated relay 30 when an intrusion is detected.

The control voltage to the sprinkler valve 36 comes from two sources, the sprinkler control unit and the intrusion detection unit. Both sources are isolated from each other by the light activated relay in the intrusion detection unit. Therefore, the output from the sprinkler control unit and the control line to the sprinkler valve 36 must be connected to the intrusion detection unit. Control voltage to the sprinkler valve 36 can be routed through and controlled by the light activated isolation relay 30 in the intrusion detection unit.

The light activated isolation relay 30 allows the sprinkler system to function as designed. The watering cycle, the watering time, and the watering sequence can all function as designed. When an intrusion is detected, typically when the sprinkler system is not active, the sensor deterrent system 10 is activated and the sprinklers in the protected area are activated and remain activated as long as the intruder is detected in the protected area.

Figure 2:
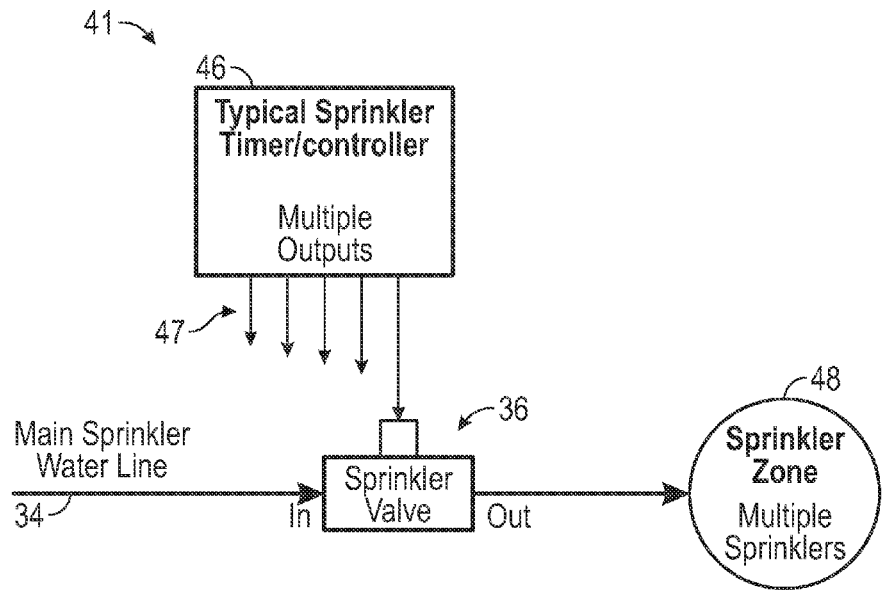
FIG. 2 illustrates a block diagram of a typical sprinkler system, in accordance with the disclosed embodiments.

Referring to FIG. 2, a block diagram of a residential sprinkler system 41 is illustrated. Note that only one circuit is shown for simplicity and ease of explanation. The system 41 generally includes a sprinkler timer/controller 46 with multiple outputs via sprinkler wiring 47 to the sprinkler valve 36 which is tied to the main sprinkler water line 34 and outputs to one or more sprinkler zones such as sprinkler zone 48. A typical residential sprinkler system can be powered by 120 VAC, which is then converted to DC voltage to power the solid state electronics in the control unit. The control unit allows the operator to set Time/Date, Program for Watering, Start Times, Valve Run Times, and Water Days. A sprinkler control systems typically provide multiple outputs to control multiple watering zones. The output shown is connected to a sprinkler valve, which is usually operated with an input of 24 VAC.

Figure 3:
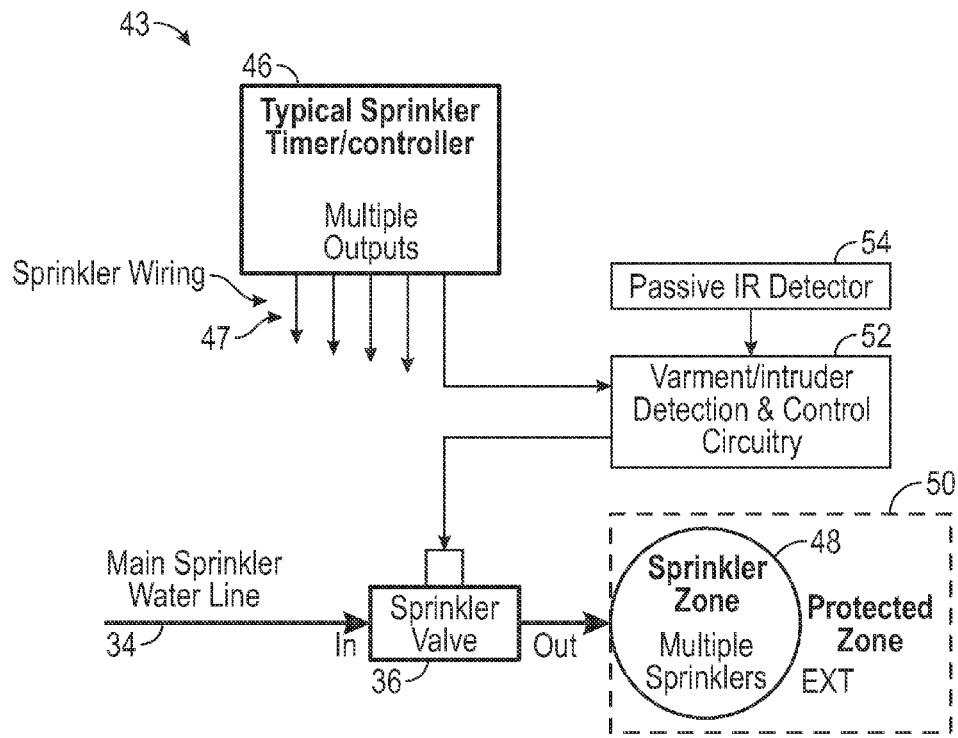
FIG. 3 illustrates a block diagram of the typical sprinkler system depicted in FIG. 2 with addition of a varmint and intruder deterrent system depicted in FIG. 1, in accordance with the disclosed embodiments.

FIG. 3 illustrates a block diagram of a sprinkler system 43, which is similar to the configuration of system 41 shown in FIG. 2, but with additional components and features. For example, a passive IR detector 54 and varment/intruder detection and control circuitry 52 are included. A protected zone 50 is also shown in FIG. 3 with respect to example sprinkler zone 48. Note that such a deterrent system can connects to only one of the sprinkler system's outputs. This is because the deterrent system can be designed to work on only one sprinkler zone. If more than one zone is to be protected, then more than one deterrent system may need to be employed.

Figure 4:
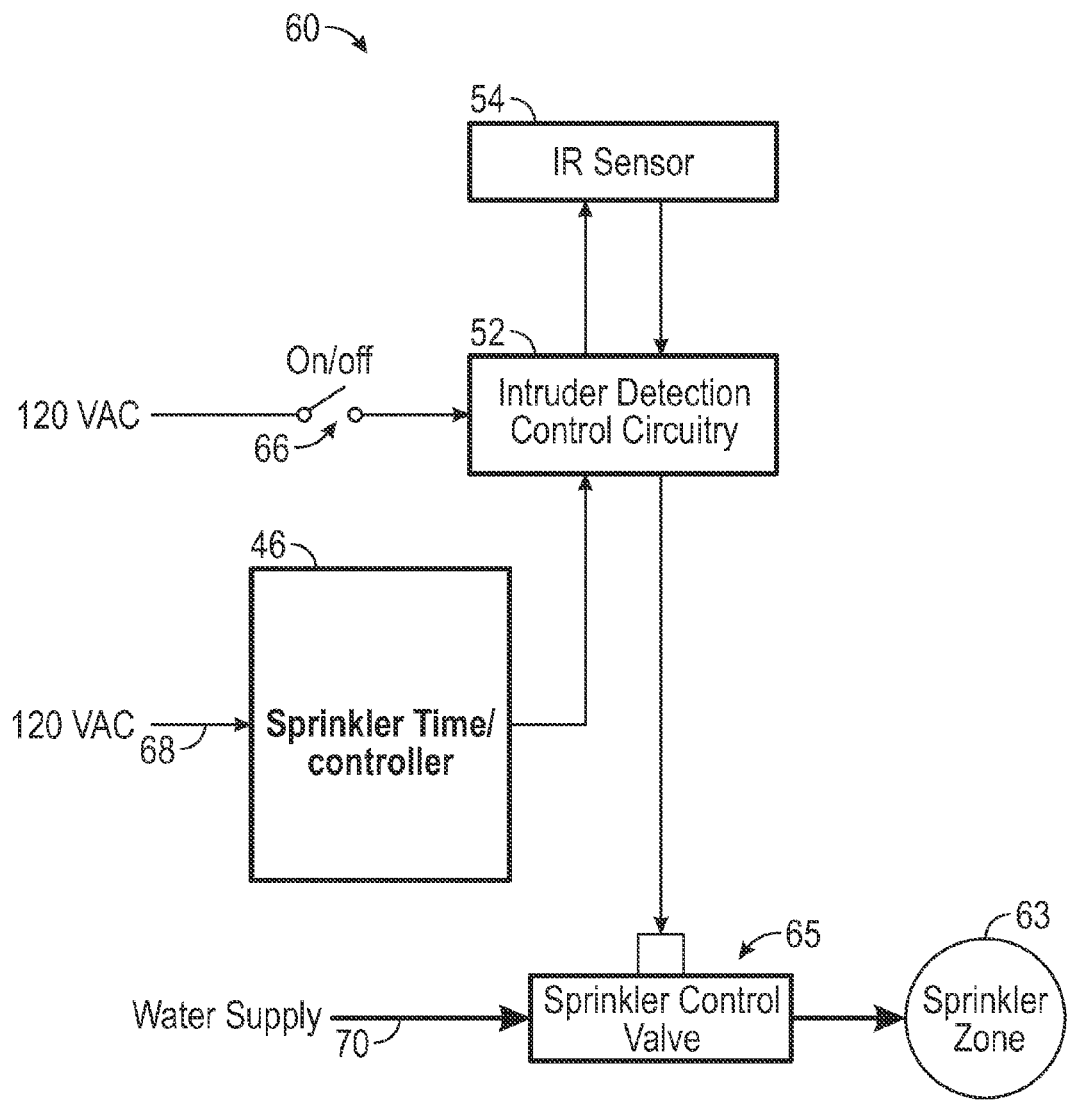
FIG. 4 illustrates a detailed block diagram of the sprinkler system, in accordance with the disclosed embodiments.

FIG. 4 illustrates a block diagram of a system 60, in accordance with an alternative embodiment. FIG. 4 presents a more detailed illustration of the configuration depicted in FIG. 3. The system 60 generally includes the IR sensor 54 which is electrically connected to the intruder detection control circuitry 52, which in turn is connected to 120 VAC via a switch 66. The sprinkler timer/controller 46 operates with respect to 120 VAC via electrical line or input 68. Output from the intruder detection control circuitry 52 is provided to the sprinkler control valve 65 which is connected to the water supply 70 and one or more sprinkler zones such as sprinkler zone 63.

The illustration shown in FIG. 4 depicts the fact that the IR Detector 54 can be separate from the intruder detection circuitry 52. In other words, the IR sensor head does not need to be collocated with the intruder detection circuitry 52. The advantage of this approach is that the control circuitry can be located in a protected area such as under the porch eve and the sensor head in an appropriate location for maximum protection of a given zone such as the front lawn of a residence. A typical protected area or zone could be the front entrance, front windows, and possibly the access to the side of the residence. This could possibly be one of the sprinkler zones. Any intruder entering the area would immediately get sprinkled with water and in most cases deterred from entering the area.

Figure 5:
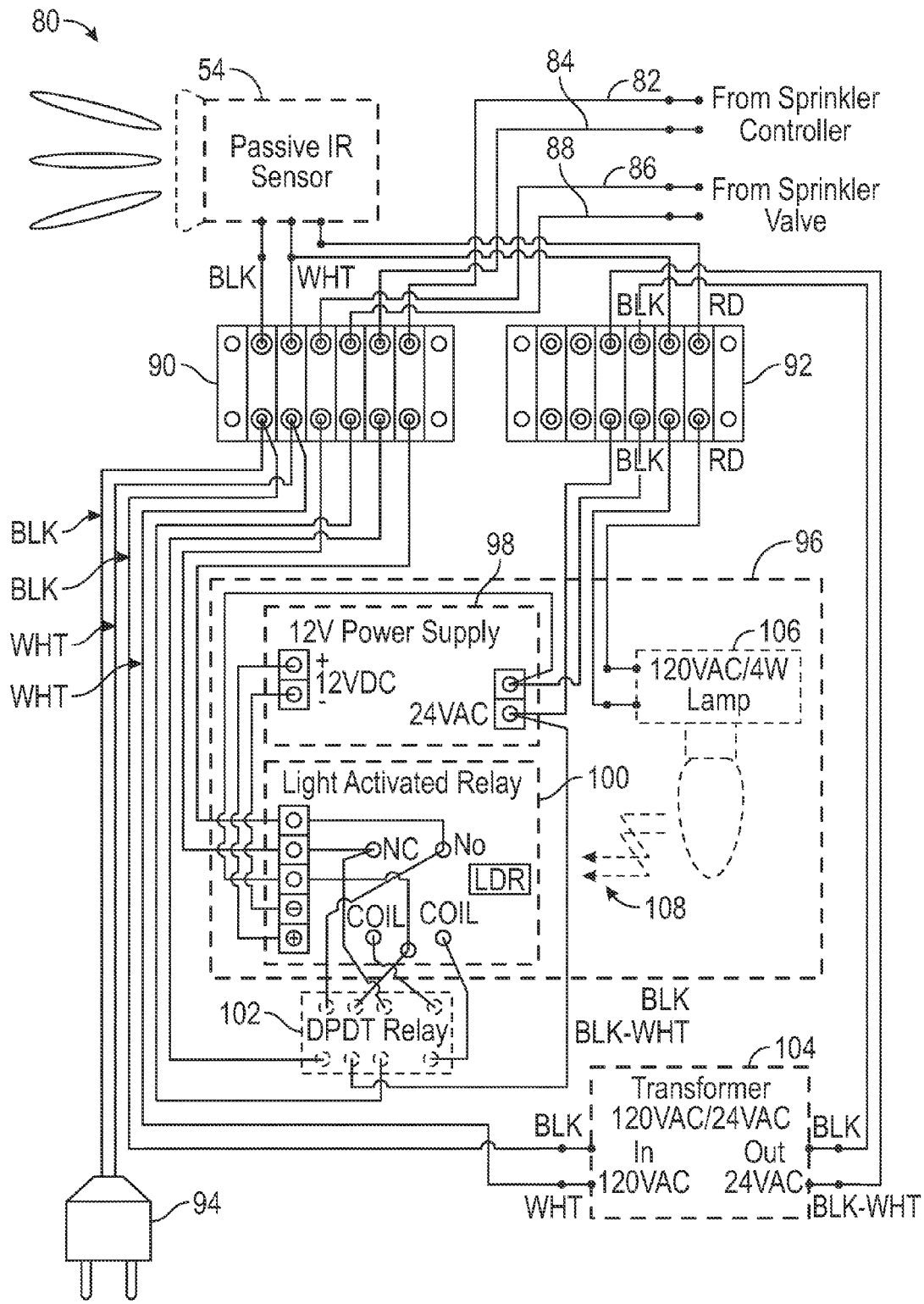
FIG. 5 illustrates a wiring diagram of a varmint and intruder deterrent system, in accordance with the disclosed embodiments.

FIG. 5 depicts a detailed wiring diagram of an intruder deterrent system 80, in accordance with an alternative embodiment. The system 80 includes three basic components: a passive IR sensor 54, intruder control circuitry, and a step down transformer 104. Note that the components shown in FIG. 5 are analogous to previous components illustrated and discusses herein, albeit referenced in some cases by different reference numerals. System 80 thus includes components such a 12 V power supply 98 and light activated relay 100 with respect to a 12 VAC/4 W lamp 106 contained within a unit 96, which in turn connects to a DPDT relay 102. Lines 82, 84 respectively connect to the sprinkler controller and lines 86, 86 connect to the sprinkler valve. Note that the DPDT relay shown in FIG. 5 is analogous to the DPDT relay 32 shown in FIG. 1. Similarly, the light activated relay 100 is analogous to the light activated relay 30 depicted in FIG. 1. The lamp 106 is analogous to the LTI 28 shown in FIG. 1 and so on.

The system 80 can be powered via an outlet connection 94. The sprinkler controller and sprinkler valve are not shown in FIG. 5. Packaging of the system 80 could be as follows: all three components could be assembled as a complete package with all components collocated or the IR sensor could be placed separately in a position which could provide maximum coverage of the protected area. All items are hard wired, including the sprinkler controller and sprinkler valve.

Based on the foregoing, it can be appreciated that a number of embodiments, preferred and alternative, are disclosed herein. For example, in one embodiment, an intruder detection and deterrent system is disclosed which can include, for example: at least one sprinkler and at least one sprinkler valve (e.g., valve 36, etc.) in operative communication with the at least one sprinkler; at least one motion sensor within a bordered zone for monitoring at least one trespasser, wherein the at least one motion sensor detects at least one trespasser entering the bordered zone and generates a sprinkler activation signal upon detection of the at least one trespasser; a step down transformer responsive to the sprinkler activation signal, wherein output of the step down transformer is utilized to activate the at least one sprinkler valve; and at least one intruder detection unit for controlling the at least one sprinkler valve on receiving the sprinkler activation signal from the at least one motion sensor, wherein the at least one sprinkler valve spray the at least one trespasser with water and deterring a movement of the at least one trespasser into the bordered zone.

In some embodiments, a sprinkler controller can be included for controlling the at least one sprinkler valve, wherein output from the sprinkler controller and the sprinkler activation signal to sprinkler valve are connected to the intrusion detection unit. In another embodiment, upon detecting the movement of the at least one trespasser into the bordered zone, a control signal for controlling the at least one sprinkler valve can derive from the intruder detection unit. In other embodiments, upon not detecting a movement of the at least one trespasser into the bordered zone, a control signal for controlling the at least one sprinkler valve comes from the sprinkler controller. In some embodiments, the at least one intruder detection unit can include at least one light activated relay. In yet other embodiments, the sprinkler activation signal can include an electrical signal.

It will be appreciated that variations of the above disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An improved intruder detection and deterrent system, comprising:

at least one sprinkler and at least one sprinkler valve in operative communication with said at least one sprinkler;

at least one motion sensor within a bordered zone for monitoring at least one trespasser, wherein said at least one motion sensor detects at least one trespasser entering said bordered zone and generates a sprinkler activation signal upon detection of said at least one trespasser;

a step down transformer that is electrically connected to said at least one motion sensor, said step down transformer responsive to said sprinkler activation signal, wherein an output of said step down transformer is utilized to activate said at least one sprinkler valve; and at least one intruder detection unit for controlling said at least one sprinkler valve upon receiving said sprinkler activation signal from said at least one motion sensor, said at least one intruder detection unit comprising at least one light activated relay responsive to a light source, said step down transformer, said at least one light activated relay and said at least one motion sensor electrically connected with one another to provide a switching feature via said at least one light activated relay between power supplied from a sprinkler controller to said at least one sprinkler valve and power supplied by said step down transformer to said at least one motion sensor such that said at least one sprinkler valve sprays said at least one trespasser with water and deters a movement of said at least one trespasser into said bordered zone.

2. The system of claim 1 wherein said sprinkler controller electrically controls said at least one sprinkler valve, wherein output from said sprinkler controller and said sprinkler activation signal to said at least one sprinkler valve are electrically connected to said intrusion detection unit.

3. The system of claim 1, whereupon detecting said movement of said at least one trespasser into said bordered zone, a control signal for controlling said at least one sprinkler valve is electrically transmitted from said intruder detection unit.

4. The system of claim 1, wherein on not detecting a movement of said at least one trespasser into said bordered zone, a control signal for controlling said at least one sprinkler valve is electrically sent from said sprinkler controller.

5. The system of claim 4 wherein said sprinkler activation signal comprises an electrical signal.

6. The system of claim 2 wherein said power supplied from said sprinkler control is derived from a power source electrically connected to said at least one motion sensor and to said step down feature via said switching feature.

7. The system of claim 6 wherein said at least one motion sensor comprises an IR (Infrared) motion sensor.

8. The system of claim 6 wherein said at least one light activated relay further comprises a depot relay that connects to said sprinkler controller and to said at least one sprinkler valve, said at least one sprinkler valve connected to a main sprinkler water line.

9. The system of claim 8 wherein said at least one sprinkler valve is connected electronically to an antisiphon mechanism that is connected to at least one water outlet.

10. The system of claim 9 wherein said IR motion sensor comprises a passive IR detector.

* * * * *